United States Patent
Wang et al.

(10) Patent No.: US 11,050,078 B2
(45) Date of Patent: Jun. 29, 2021

(54) SYSTEMS AND METHODS OF DECOUPLED HYDROGEN GENERATION USING ENERGY-BEARING REDOX PAIRS

(71) Applicant: BATTELLE MEMORIAL INSTITUTE, Richland, WA (US)

(72) Inventors: Wei Wang, Kennewick, WA (US); Dongping Lu, Richland, WA (US); Yuyan Shao, Richland, WA (US); Qian Huang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 18 days.

(21) Appl. No.: 15/988,213

(22) Filed: May 24, 2018

(65) Prior Publication Data

US 2018/0269516 A1  Sep. 20, 2018

Related U.S. Application Data

(63) Continuation-in-part of application No. 15/004,717, filed on Jan. 22, 2016.
(Continued)

(51) Int. Cl.
*C25B 1/00* (2021.01)
*C25B 15/00* (2006.01)
(Continued)

(52) U.S. Cl.
CPC ............. *H01M 8/188* (2013.01); *C25B 1/04* (2013.01); *C25B 9/73* (2021.01);
(Continued)

(58) Field of Classification Search
CPC .......... C25B 1/00; C25B 15/08; C25B 15/00; C25B 15/02; C25B 3/02; C25B 9/06; C25B 9/18; C25B 9/00
See application file for complete search history.

(56) References Cited

U.S. PATENT DOCUMENTS 4,262,066 A    4/1981   Brenneman et al.
4,460,444 A    7/1984   Maskalick
                (Continued)

FOREIGN PATENT DOCUMENTS

JP    2001-233602    8/2001
JP    2011-510466    3/2011
              (Continued)

OTHER PUBLICATIONS

Bloor, L. G., et al., Solar-Driven Water Oxidation and Decoupled Hydrogen Production Mediated by an Electron-Coupled-Proton Buffer, Journal of the American Chemical Society, 138, 2016, 6707-6710.

(Continued)

*Primary Examiner* — Zulmariam Mendez
(74) *Attorney, Agent, or Firm* — Wells St. John P.S.

(57) ABSTRACT

Described herein are systems and methods of hydrogen generation and electrolyte regeneration as independent operations in separate redox flow cells. The operations can be decoupled by using an energy-bearing redox pair that electrochemically bears energy facilitating flexible, efficient hydrogen generation. In one example, the hydrogen generation redox flow cell can include a liquid, energy-bearing electrolyte solution in which at least one species of an energy-bearing redox pair is dissolved, to decouple the hydrogen evolution reaction from the reaction at the opposite electrode (e.g., the oxygen evolution reaction of conventional direct water electrolysis). Each species of the energy-bearing redox pair is associated with a standard electrode potential within the water electrolysis window.

7 Claims, 5 Drawing Sheets

Related U.S. Application Data (60) Provisional application No. 62/612,849, filed on Jan. 2, 2018, provisional application No. 62/106,641, filed on Jan. 22, 2015.

(51) Int. Cl.
*H01M 8/18* (2006.01)
*H01M 8/04858* (2016.01)
*C25B 1/04* (2021.01)
*C25B 9/73* (2021.01)

(52) U.S. Cl.
CPC ....... *H01M 8/04925* (2013.01); *H01M 8/186* (2013.01); *Y02E 60/36* (2013.01); *Y02E 60/50* (2013.01)

(56) References Cited

U.S. PATENT DOCUMENTS

| | | |
|---|---|---|
| 4,608,137 A | 8/1986 | Vaughan et al. |
| 4,786,567 A | 11/1988 | Skyllas-Kazacos et al. |
| 5,250,158 A | 10/1993 | Kaneko et al. |
| 5,711,865 A * | 1/1998 | Caesar ............... C25B 1/04 205/628 |
| 6,063,258 A | 5/2000 | Sayama et al. |
| 6,093,501 A | 7/2000 | Werth |
| RE36,985 E | 12/2000 | Trainham, III et al. |
| 6,737,189 B1 | 5/2004 | Vandayburg et al. |
| 7,754,183 B2 | 7/2010 | Keskar et al. |
| 8,628,880 B2 | 1/2014 | Li et al. |
| 8,771,856 B2 | 7/2014 | Li et al. |
| 9,023,529 B2 | 5/2015 | Liu et al. |
| 9,123,931 B2 | 9/2015 | Li et al. |
| 9,130,218 B2 | 9/2015 | Wang et al. |
| 9,214,695 B2 | 12/2015 | Wang et al. |
| 9,236,620 B2 | 1/2016 | Li et al. |
| 9,406,960 B2 | 8/2016 | Xiao et al. |
| 9,421,521 B2 | 8/2016 | Danilovic et al. |
| 9,543,609 B2 | 1/2017 | Amstutz et al. |
| 2004/0241552 A1 | 12/2004 | Skyllas-Kazacos |
| 2009/0061267 A1 | 3/2009 | Monzyk et al. |
| 2010/0310941 A1 | 12/2010 | Kumta et al. |
| 2011/0014532 A1 | 1/2011 | Knuckey et al. |
| 2011/0086247 A1 | 4/2011 | Keshavarz et al. |
| 2011/0195342 A1 | 8/2011 | Luo et al. |
| 2011/0212384 A1 | 9/2011 | Luo et al. |
| 2012/0077068 A1 | 3/2012 | Wang et al. |
| 2013/0273459 A1 | 10/2013 | Xu et al. |
| 2014/0170511 A1* | 6/2014 | Tolmachev ........... H01M 8/188 429/418 |
| 2014/0234536 A1 | 8/2014 | Xu et al. |
| 2014/0234735 A1 | 8/2014 | Zhang |
| 2015/0147673 A1 | 5/2015 | Li et al. |
| 2017/0179558 A1 | 6/2017 | McKone et al. |

FOREIGN PATENT DOCUMENTS

| | | |
|---|---|---|
| WO | WO 89/05363 | 8/1989 |
| WO | WO 2008/123911 | 10/2008 |

OTHER PUBLICATIONS

Chen, L., et al., Separating hydrogen and oxygen evolution in alkaline water electrolysis using nickel hydroxide, Nature Communications, 2016, 1-8.
Palumbo, R., et al., Solar thermal decoupled water electrolysis process I: Proof of Concept, Chemical Engineering Science, 84, 2012, 372-380.
Rausch, B., et al., Decoupled catalytic hydrogen evolution from a molecular metal oxide redox mediatior in water splitting, Science, 345, 2014, 1326-1331.
Zhang, S. et al., Electrostatic Self-Assembly of a Pt-around-Au Nanocomposite with High Activity towards Formic Acid Oxidation, Agnew. Chem. Int. Ed., 49, 2010, 2211-2214.
Fatih, K., et al., Advancements in the Direct Hydrogen Redox Fuel Cell, Electrochemical and Solid-State Letters, 11, 2, 2008, B11-B15.
Ellis et al., "Study of n-Type Semiconducting Cadmium Chalcogenide-Based Photoelectrochemical Cells Employing Polychalcogenide Electrolytes", Journal of the American Chemical Society vol. 99, No. 9, Apr. 1977, United States, pp. 2839-2848.
Maeda, "Z-Scheme Water Splitting Using Two Different Semiconductor Photocatalysts", ACS Catalysis vol. 3, No. 7, May 2013, United States, pp. 1486-1503.
Aaron et al., "Dramatic Performance Gains in Vanadium Redox Flow Batteries Through Modified Cell Architecture", Journal of Power Sources vol. 206, 2012, Netherlands, pp. 450-453.
Alon et al., "Feasibility Study of Hydrogen/Iron Redox Flow Cell for Grid-Storage Applications", Journal of Power Sources vol. 240, 2013, Netherlands, pp. 417-420.
Antolini et al., "Effects of Geometric and Electronic Factors on ORR Activity of Carbon Supported Pt—Co Electrocatalysts in PEM Fuel Cells", International Journal of Hydrogen Energy vol. 30, 2005, United Kingdom, pp. 1213-1220.
Ayers et al., "(Industrial Electrochemistry & Electrochemical Engineering Division NET Award) Development of Large Scale Commercial PEM Electrolysis", ECS Meeting Abstracts 1205-1205, available online at http://ma.ecsdl.org/content/MA2015-01/16/1205.short, 2015, 2 pages.
Ayers et al., "Characterization of Iron (VI) Compounds and Their Discharge Products in Strongly Alkaline Electrolyte", Journal of the Electrochemical Society vol. 152, 2005, United States, pp. A467-A473.
Ayers et al., "Research Advances Towards Low Cost, High Efficiency PEM Electrolysis", ECS Transactions vol. 33, 2010, United States, pp. 3-15.
Ayers et al., "Characterization of Anion Exchange Membrane Technology for Low Cost Electrolysis Modeling and System Studies", ECS Transactions vol. 45, 2013, United States, pp. 121-130.
Ayers et al., "Efficient Generation of High Energy Density Fuel from Water", ECS Transactions vol. 41, 2012, United States, pp. 27-38.
Ayers et al., "Fueling Vehicles with Sun and Water", Photoelectrochemical Cells and Biological Devices, ECS Transactions vol. 50, 2013, United States, pp. 35-46.
Ayers et al., "Hydrogen Infrastructure Challenges and Solutions", ECS Transaction vol. 41, 2012, United States, pp. 75-83.
Ayers et al., "Recent Advances in Cell Cost and Efficiency for PEM-Based Water Electrolysis", ECS Transactions vol. 41, 2012, United States, pp. 15-22.
Ayers, "Low-Noble-Metal-Content Catalysts/Electrodes for Hydrogen Production by Water Electrolysis", DOE Annual Merit Review, available online at http://www.hydrogen.energy.gov/pdfs/review15/pd098_ayers_2015_o.pdf, 2015, 24 pages.
Bashyam et al., "A Class of Non-Precious Metal Composite Catalysts for Fuel Cells", Nature vol. 443, 2006, United Kingdom, pp. 63-66.
Bullis, "Hydrogen Storage Could be Key to Germany's Energy Plans", MIT Technology Review, available online at https://www.technologyreview.com/s/427360/hydrogen-storage-could-be-key-to-germanys-energy-plans/, Mar. 2012, 4 pages.
Candelaria et al., "Nanostructured Carbon for Energy Storage and Conversion", Nano Energy vol. 1, 2012, Netherlands, pp. 195-220.
Chang et al., "Activity-Stability Relationship in the Surface Electrochemistry of the Oxygen Evolution Reaction", Faraday Discussions vol. 176, 2014, United Kingdom, pp. 125-133.
Chang et al., "Functional Links Between Stability and Reactivity of Strontium Ruthenate Single Crystals During Oxygen Evolution", Nature Communications vol. 5, 2014, United Kingdom, 9 pages.
Chen et al., "Highly Crystalline Multimetallic Nanoframes with Three-Dimensional Electrocatalytic Surfaces", Science vol. 343, 2014, United States, pp. 1339-1343.

(56) References Cited

OTHER PUBLICATIONS

Crawford et al., "Comparative Analysis for Various Redox Flow Batteries Chemistries using a Cost Performance Model", Journal of Power Sources vol. 293, 2015, Netherlands, pp. 388-399.
Danilovic et al., "Activity-Stability Trends for the Oxygen Evolution Reaction on Monometallic Oxides in Acidic Environments", Journal of Physical Chemistry Letters vol. 5, 2014, United States, pp. 2474-2478.
Danilovic et al., "Using Surface Segregation to Design Stable Ru—Ir Oxides for the Oxygen Evolution Reaction in Acidic Environments", Angewandte Chemie vol. 126, 2014, United Kingdom, pp. 14240-14245.
Debe et al., "Initial Performance and Durability of Ultra-Low Loaded NSTF Electrodes for PEM Electrolyzers", Journal of The Electrochemical Society vol. 159, 2012, United States, pp. K165-K176.
Department of Energy, "Grid Energy Storage", U.S. Department of Energy, available online at http://energy.gov/site/prod/files/2014/09/f18/Grid%20Energy%20Storage%20December%202013.pdf, 2013, 67 pages.
European Wind and Ebergy Association, "Wind in Power: 2011 European Statistics", available online at http://www.ewea.org/fileadmin/files/library/publications/statistics/Wind_in_power_2011_European_statistics.pdf, Feb. 2012, 11 pages.
Fachverband Biogas e.V., "Biogas Segment Statistics 2014", available online at http://www.biogas.org/edcom/webfvb.nsf/id/DE_Branchenzahlen/, 2014, 2 pages.
Fajardo et al., "New Approaches to Solar-Energy Conversion UsingSi/Liquid Junctions", Solar Energy Materials and Solar Cells vol. 38, 1995, Netherlands, pp. 279-303.
Fu et al., "An Integral Proton Conducting SOFC for Simultaneous Production of Ethylene and Power from Ethane", Chemical Communications vol. 46, 2010, United Kingdom, pp. 2052-2054.
Gasteiger et al., "Just a Dream—Or Future Reality?", Science vol. 324, 2009, United States, pp. 48-49.
Greeley et al., "The Road from Animal Electricity to Green Energy: Combining Experiment and Theory in Electrocatalysis", Energy & Environmental Science vol. 5, 2012, United Kingdom, pp. 9246-9256.
Han et al., "Diffusional Motion of Redox Centers in Carbonate Electrolytes", Jounral of Chemical Physics vol. 141, 2014, United States, 8 pages.
Herranz et al., "Unveiling N-Protonation and Anion-Binding Effects on Fe/N/C Catalysts for O2 Reduction in Proton-Exchange-Membrane Fuel Cells", Journal of Physical Chemistry C vol. 115, 2011, United States, pp. 16087-16097.
James et al., "PEM Electrolysis H2A Production Case Study Documentation", Department of Energy, available online at http://www.hydrogen.energy.gov/pdfs/h2a_pem_electrolysis_case_study_documentation.pdf, 2013, 27 pages.
Jaouen et al., "Recent Advances in Non-Precious Metal Catalysis for Oxygen Reduction Reaction in Polymer Electrolyte Fuel Cells", Energy and Environmental Science vol. 4, 2011, United Kingdom, pp. 114-130.
Ji et al., "Controlling SEI Formation on SnSb-Porous Carbon Nanofibers for Improved Na Ion Storage", Advanced Materials vol. 26, 2014, United States, pp. 2901-2908.
Kim et al., "Chloride Supporting Electrolytes for All-Vanadium Redox Flow Batteries", Physical Chemistry Chemical Physics vol. 13, 2011, United Kingdom, pp. 18186-18193.
Kim et al., "1 kW/1kWh Advanced Vanadium Redox Flow Battery Utilizing Mixed Acid Electrolytes", Jounral of Power Sources vol. 237, 2013, Netherlands, pp. 300-309.
Koh et al., "Activity-Stability Relationships of Ordered and Disordered Alloy Phases of Pt3Co Electrocatalysts for the Oxygen Reduction Reaction (ORR)", Electrochimica Acta vol. 52, 2007, United Kingdom, pp. 2765-2774.

Kou et al., "Stabilization of Electrocatalytic Metal Nanoparticles at Metal-Metal Oxide-Graphene Triple Junction Points", Jounral of the America Chemical Society vol. 133, 2011, United States, pp. 2541-2547.
Lezama et al., "Spectroscopic Evidence on the Interaction of Prephenate, a Shikimate Pathway Intermediate, with Oxidovanadium(IV) Species", Inorganica Chimica Acta vol. 363, 2010, Netherlands, pp. 1593-1596.
Li et al., "A Stable Vanadium Redox-Flow Battery with High Energy Density for Large-scale Energy Storage", Advanced Energy Materials vol. 1, 2011, Germany, pp. 394-400.
Li et al., "Ambipolar Zinc-Polyiodide Electrolyte for High Energy Density Aqueous Redox Flow Battery", Nature Communications vol. 6, 2015, United Kingdom, 8 pages.
Li et al., "Bismuth Nanoparticle Decorating Graphite Felt as a High-Performance Electrode for an All-Vanadium Redox Flow Battery", Nano Letters vol. 13, 2013, United States, pp. 1330-1335.
Li et al., "Nanorod Niobium Oxide as Powerful Catalysts for an all Vanadium Redox Flow Battery", Nano Letters vol. 14, 2013, United States, pp. 158-165.
Li et al., "Capacity Decay Mechanism of Microporous Separator-Based All-Vanadium Redox Flow Batteries and its Recovery", ChemSusChem vol. 7, 2014, Germany, pp. 577-584.
Li et al., "Fe/V Redox Flow Battery Electrolyte Investigation and Optimization", Journal of Power Sources vol. 229, 2013, Netherlands, pp. 1-5.
Litter, "Heterogeneous Photocatalysis: Transition Metal Ions in Photocatalytic Systems", Applied Catalysis B: Environmental vol. 23, 1999, Netherlands, pp. 89-114.
Long et al., "Electrochemical Characterization of High-Surface-Area Catalysts and Other Nanoscale Electroactive Materials at Sticky-Carbon Electrodes", Journal of Electroanalytical Chemistry vol. 522, 2002, Netherlands, pp. 58-65.
Luo et al., "Capacity Decay and Remediation of Nafion-Based All-Vanadium Redox Flow Batteries", ChemSusChem vol. 6, 2013, Germany, pp. 268-274.
Martin et al., "Time-Resolved Microwave Conductivity Part 2—Quantum-Sized TiO2 and the Effect of Adsorbates and Light Intensity on Charge-Carrier Dynamics", Journal of the Chemical Society, Faraday Transactions vol. 90, 1994, United Kingdom, pp. 3323-3330.
Menictas et al., "Evaluation of an NH4VO3-Derived Electrolyte for the Vanadium-Redox Flow Battery", Journal of Power Sources vol. 45, 1993, Netherlands, pp. 43-54.
Ohno et al., "Unique Effects of Iron(III) ions on Photocatalytic and Photoelectrochemical Properties of Titanium Dioxide", Journal of Physical Chemistry B vol. 101, 1997, United States, pp. 6415-6419.
Paciok et al., "Sensivity Analysis of a PEM Electrolyser Cathode with Respect to the Platinum and Nafion Loading", Electrochemical Society Meeting Abstracts 1552-1582, availabie online at http://ma.ecsdl.org/content/MA2015-01/26/1562.short, 2015, 2 pages.
Park et al., "Oxygen Electrocatalysts for Water Electrolyzers and Reversible Fuel Cells: Status and Perspective", Energy & Environmental Science vol. 5, 2012, United Kingdom, pp. 9331-9344.
Parrondo et al., "Degradation of Anion Exchange Membranes Used for Hydrogen Production by Ultrapure Water Electrolysis", Royal Society of Chemistry Adv. 2014, 4, United Kingdom, pp. 9875-9879.
Perry et al., "High Power Density Redox Flow Battery Cells", ECS Transactions vol. 53, 2013, United States, pp. 7-16.
Pomykal et al., "Measurement of Interfacial Charge Transfer Rate Constants at n-type InP/CH3OH Junctions", Jounral of Physical Chemistry B vol. 101, 1997, United States, pp. 2476-2484.
Pomykal et al., "Stability of n-Si/CH3OH Contacts as a Function of the Reorganization Energy of the Electron-Donor", Journal of Physical Chemistry vol. 99, 1995, United States, pp. 8302-8310.
Pomykal et al., "Theoretical and Experimental Upper Bounds on Interfacial Charge-Transfer Rate Constants Between Semiconducting Solids and Outer-Sphere Redox Couples", Journal of Physical Chemistry vol. 100, 1996, United States, pp. 3652-3664.
Rahman et al., "Vanadium Redox Battery: Positive Half-Cell Electrolyte Studies", Jounral of Power Sources vol. 189, 2009, Netherlands, pp. 1212-1219.

(56) References Cited

OTHER PUBLICATIONS

Ramaswamy et al., "Fundamental Mechanistic Understanding of Electrocatalysis of Oxygen Reduction on Pt and non-Pt Surfaces: Acid Versus Alkaline Media", Advances in Physical Chemistry, 2012, Egypt, 17 pages.
Reiche et al., "Heterogeneous Photocatalytic and Photosynthetic Deposition of Copper on TiO2 and WO3 Powders", Journal of Physical Chemistry vol. 83, 1979, United States, pp. 2248-2251.
Roller et al., "Flame-Based Processing as a Practical Approach for Manufacturing Hydrogen Evolution Electrodes", Journal of Power Sources vol. 271, 2014, Netherlands, pp. 366-376.
Sauve et al., "Dye Sensitization of Nanocrystalline Titanium Dioxide with Osmium and Ruthenium Polypyridyl Complexes", Journal of Physical Chemistry B vol. 104, 2000, United States, pp. 6821-6836.
Sauve et al., "High Quantum Yield Sensitization of Nanocrystalline Titanium Dioxide Photoelectrodes with cis-Dicyanobis(4,4'-dicarboxy-2,2'- bipyridine)osmiurn(II) or Tris(4,4'-dicarboxy-2,2'-bipyridine)osmium(II) Complexes", Journal of Physical Chemistry B vol. 104, 2000, United States, pp. 3488-3491.
Sclafani et al., "N2 Photoreduction and Phenol and Nitrophenol Isomers Photooxidation as Examples of Heterogeneous Photocatalytic Reactions", Research on Chemical Intermediates vol. 18, 1993, Germany, pp. 211-226.
Sclafani et al., "Photocatalytic Degradaton of Phenol in Aqueous Polycrystalline TiO2 Dispersions: The Influence of Fe3+, Fe2+ and Ag+ on the Reaction Rate", Journal of Photochemistry and Photobiology A: Chemistry vol. 56, 1991, Netherlands, pp. 113-123.
Seley et al., "Combinatorial Search for Improved Metal Oxide Oxygen Evolution Electrocatalysts in Acidic Electrolytes", ACS Combinatorial Science vol. 15(2), 2013, United States, pp. 82-89.
Shao et al., "Electrocatalysts for Nonaqueous Lithium Air Batteries: Status, Challenges and Perspective", ACS Catalysis vol. 2, 2012, United States, pp. 844-857.
Shao et al., "Electrochemical Investigation of Polyhalide Ion Oxidation-Reduction on Carbon Nanotube Electrodes for Redox Flow Batteries", Electrochemistry Communications vol. 11, 2009, Netherlands, pp. 2064-2067.
Shao et al., "Facile and Controllable Electrochemical Reduction of Graphene Oxide and its Applications", Journal of Materials Chemistry vol. 20, 2009, United Kingdom, pp. 743-748.
Shao et al., "Highly Reversible Mg Insertion in Nanostructured Bi for Mg Ion Batteries", Nano Letters vol. 14, 2014, United States, pp. 255-260.
Shao et al., "Making Li-Air Batteries Rechargeable: Material Challenges", Advanced Functional Materials vol. 23, 2013, United Kingdom, pp. 987-1004.
Shao et al., "Nitrogen-Doped Mesoporous Carbon for Energy Storage in Vanadium Redox Flow Batteries", Journal of Power Sources vol. 195, 2010, Netherlands, pp. 4375-4379.
Shao et al., "Novel Catalyst Support Materials for PEM Fuel Cells: Current Status and Future Prospects", Journal of Materials Chemistry vol. 19, 2009, United Kingdom, pp. 46-59.
Shao et al., "The Corrosion of PEM Fuel Cell Catalyst Supports and its Implications for Developing Durable Catalysts", Electrochimica Acta vol. 54, 2009, United Kingdom, pp. 3109-3114.
Shao et al., "Surface Driven Sodium Ion Energy Storage in Nanocellular Carbon Foams", Nano Letters vol. 13, 2013, United States, pp. 3909-3914.
Shreve et al., "Limits on the Corrosion Rate of Si Surfaces in Contact with CH3OH-Ferrocene+/0 and CH3OH-1,1'-Dimethylferrocene+/0 Solutions", Journal of Physical Chemistry vol. 99, 1995, United States, pp. 5575-5580.
Stamenkovic et al., "Improved Oxygen Reduction Activity on Pt3Ni(111) via Increased Surface Site Availability", Science vol. 315, 2007, United States, pp. 493-497.
Stephenson et al., "Electrochemical Model of the Fe/V Redox Flow Battery", Journal of the Electrochemical Society vol. 159, 2012, United States, pp. A1993-A2000.
Strmcnik et al., "Improving the Hydrogen Oxidation Reaction Rate by Promotion of Hydroxyl Adsorption", Nature Chemistry vol. 5, 2013, United Kingdom, pp. 300-306.
Subbaraman et al., "Enhancing Hydrogen Evolution Activity in Water Splitting by Tailoring Li+—Ni(OH)2-Pt Interfaces", Science vol. 334, 2011, United States, pp. 1256-1260.
Toops et al., "Evaluation of Nitrided Titanium Separator Plates for Proton Exchange Membrane Electrolyzer Cells", Journal of Power Sources vol. 272, 2014, Netherlands, pp. 954-960.
Tucker et al., "Performance and Cycling of the Iron-Ion/Hydrogen Redox Flow Cell with Various Catholyte Salts", Journal of Applied Electrochemistry vol. 43, 2013, Netherlands, pp. 637-644.
Tucker et al., "Optimization of the Iron-Ion/Hydrogen Redox Flow Cell with Iron Chloride Catholyte Salt", Journal of Power Sources vol. 245, 2014, Netherlands, pp. 691-697.
Tylus et al., "Elucidating Oxygen Reduction Active Sites in Pyrolyzed Metal-Nitrogen Coordinated Non-Precious-Metal Electrocatalyst Systems", Journal of Physical Chemistry C vol. 118, 2014, United States, pp. 8999-9008.
Vijayakumar et al., "Elucidating the Higher Stability of Vanadium(V) Cations in Mixed Acid Based Redox Flow Battery Electrolytes", Journal of Power Sources vol. 241, 2013, Netherlands, pp. 173-177.
Viswanathan et al, "Cost and Performance Model for Redox Flow Batteries", Journal of Power Sources vol. 247, 2014, Netherlands, pp. 1040-1051.
Wang et al., "A New Hybrid Redox Flow Battery with Multiple Redox Couples", Journal of Power Sources vol. 216, 2012, Netherlands, pp. 99-103.
Wang et al., "A New Redox Flow Battery using Fe/V Redox Couples in Chloride Supporting Electrolyte", Energy & Environmental Science, 2011, United Kingdom, pp. 4068-4073.
Wang et al., "Li-Ion Battery with LiFePO4 Cathode and Li4Ti5O12 Anode for Stationary Energy Storage", Metallurgical and Materials Transactions A: Physical Metallurgy and Materials Science vol. 44A, 2013, United States, pp. 21-25.
Wang et al., "Ultralow Charge-Transfer Resistance with Ultralow Pt Loading for Hydrogen Evolution and Oxidation using Ru@Pt Core-Shell Nanocatalysts", Sci, Rep. 5, 2015, United States, 8 pages.
Ward et al., "Photocurrent Enhancement via Trapping of Photogenerated Electrons of TiO2 Particles", Journal of Physical Chemistry vol. 86, 1982, United States, pp. 3599-3605.
Wei et al., "Performance Evaluation of Microporous Separator in Fe/V Redox Flow Battery", ECS Transactions vol. 45, 2013, United States, pp. 17-24.
Wei et al., "Polyvinyl Chloride/Silica Nanoporous Composite Separator for All-Vanadium Redox Flow Battery Applications", Journal of the Electrochemical Society vol. 160, 2013, United States, pp. A1215-A1218.
Wei et al., "TEMPO-Based Catholyte for High Energy Density Nonaqueous Redox Flow Batteries", Advanced Materials vol. 26, 2014, United States, pp. 7649-7653.
Wei et al., "Towards High-Performance Nonagueous Redox Flow Electrolyte through Ionic Modification of Active Species", Advanced Energy Materials vol. 5, 2015, Germany, 7 pages.
Wei et al., "Nanoporous Polytetrafluoroethylene/Silica Composite Separator as a High Performance All-Vanadium Redox Flow Battery Membrane", Advanced Energy Materials vol. 3, 2013, Germany, pp. 1215-1220.
Wu et al., "High-Performance Electrocatalysts for Oxygen Reduction Derived from Polyaniline, Iron, and Cobalt", Science vol. 332, 2011, United States, pp. 443-447.
Xu et al., "Simply AlF3-Treated Li4Ti5O12 Composite Anode Materials for Stable and Ultrahigh Power Lithium-Ion Batteries", Journal of Power Sources vol. 236, 2013, Netherlands, pp. 169-174.
Zhang et al., "Effects of Additives on the Stability of Electrolytes for All-Vanadium Redox Flow Batteries", Journal of Applied Electrochemistry vol. 41, 2011, Netherlands, pp. 1215-1221.
Han, "Photo-Electrochemical Hydrogen Production", Technical Report by MVSystems, Inc. for U.S. Dept. of Energy, http://osti.gov/biblio/1111421, Dec. 2013, United States, 58 pages.

(56) References Cited

OTHER PUBLICATIONS

Kaneshiro et al., "Advances in Copper-Chalcopyrite Thin Films for Solar Energy Conversion", Solar Energy Materials, Jan. 2010, Netherlands, pp. 12-16.

\* cited by examiner

SYSTEMS AND METHODS OF DECOUPLED HYDROGEN GENERATION USING ENERGY-BEARING REDOX PAIRS

PRIORITY

This invention claims priority from and is a continuation in part of currently pending patent application Ser. No. 15/004,717, filed Jan. 22, 2016, which claims priority to U.S. Provisional Patent application No. 62/106,641, filed Jan. 22, 2015. This invention also claims priority to U.S. Provisional Patent Application No. 62/612,849, filed Jan. 2, 2018. The entirety of said applications are incorporated herein by reference.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to electrical energy storage and delivery and more particularly to decoupled hydrogen generation involving redox flow cells comprising an energy-bearing redox species.

BACKGROUND

Hydrogen is a clean and dense energy carrier. It can be used for many important applications, including, but not limited to storing intermittent solar energy and providing sustainable fuel for fuel cells. Hydrogen is also an important industrial gas that is widely used in food, medical, and many other industries. Over 95% of today's hydrogen is produced by reforming fossil fuels, which demands exhaustible natural sources and can lead to serious $CO_2$ emissions and air pollution. Hydrogen generated from fossil fuel reforming can also contain impurities that need further purification. In contrast, water electrolysis stands out as a clean and scalable technology for high purity hydrogen production. Modern proton exchange membrane (PEM) electrolysis is a commercially mature technology with system simplicity and ease of maintenance due its membrane design allowing for differential pressure operation and water as a single input. However, PEM electrolysis can be associated with high costs. Large operating costs in addition to the already high capital costs, can make PEM electrolysis impractical for hydrogen generation. A significant contributor to the operating cost is the expense of required energy input. Accordingly, a need exists for systems and methods of hydrogen generation that minimize operating cost

SUMMARY

Disclosed herein are systems and methods for generating hydrogen. In some embodiments, the system can comprise a first redox flow cell generating hydrogen and having a positive electrode side oxidizing an energy-bearing redox species dissolved in a liquid, energy-bearing, electrolyte solution to an oxidized state; a negative electrode side comprising a $H^+/H_2$ half-cell; and a proton permeable membrane separating the positive electrode and negative electrode sides. The system can further comprise a second redox flow cell regenerating the liquid, energy-bearing electrolyte solution and having a negative electrode side reducing the energy-bearing redox species to a reduced state; a positive electrode side comprising an oxygen evolution reaction (OER) half-cell; and a proton permeable membrane separating the positive electrode and negative electrode sides. The energy-bearing redox species can be associated with a reversible redox reaction having a standard electrode potential within the water electrolysis voltage window for the electrolyte solution, and wherein the first and second redox flow cells are decoupled for independent operation one from another. In a highly acidic electrolyte solution, the water electrolysis voltage window can be between 0 V and 1.23 V. The window can change with the pH according to a Pourbaix diagram.

In certain embodiments, the system can further comprise a circulation sub-system configured to transfer a first, liquid, energy-bearing, electrolyte solution comprising the energy-bearing redox species from the first redox flow cell to the second, and configured to transfer a second, liquid, energy-bearing, electrolyte solution comprising the energy-bearing redox species from the second redox flow cell to the first. The electrolyte solution transferred from the first redox flow cell to the second can predominantly comprise the energy-bearing redox species in an oxidized state. The electrolyte solution transferred from the second redox flow cell to the first can predominantly comprise the energy-bearing redox species in a reduced state.

In certain embodiments, the circulation sub-system further comprises a first storage container configured to store a portion of the first liquid, energy-bearing, electrolyte solution and a second storage container configured to store a portion of the second liquid, energy-bearing, electrolyte solution. In certain embodiments, the system can further comprise a controller operably connected to the first and second redox flow cells and configured to select for operation of the first redox flow cell alone, the second redox flow cell alone, or concurrently both based on an energy-market condition. In certain embodiments, the energy-market condition comprises price of energy supply, energy demand, power grid health, $H_2$ price, $H_2$ demand, time of day, weather conditions, or a combination thereof.

In certain embodiments, the energy-bearing redox species in the reduced and oxidized states comprise $Fe^{2+}$ and $Fe^{3+}$, respectively. In certain embodiments, the energy-bearing redox species comprises iodine, vanadium, bromine, chlorine, TEMPO, respectively. In certain embodiments, the liquid, energy-bearing electrolyte solution comprises an aqueous acid solution. In certain embodiments, the aqueous acid solution comprises a dissolved acid having a concentration greater than or equal to 2 M, 4 M, 6 M, 8 M, or 10 M. In certain embodiments, the liquid, energy-bearing electrolyte solution comprises the energy-bearing redox species in an amount greater than or equal to 0.5 M, 1 M, 1.5 M, 2 M, 3 M, 4 M, 5 M, or 8 M.

In some embodiments, a method of producing fuel can comprise the step of generating hydrogen in a first redox flow cell having a negative electrode side comprising a $H^+/H_2$ half-cell and oxidizing an energy-bearing redox species from a reduced state to an oxidized state on a positive-electrode side, wherein the energy-bearing redox species is dissolved in a liquid, energy-bearing, electrolyte solution, and is associated with a reversible redox reaction having a standard electrode potential within the water electrolysis voltage window for the electrolyte solution. The method can further comprise regenerating the liquid, energy-bearing electrolyte solution by reducing the energy-bearing redox species from the oxidized state to the reduced state on a negative-electrode side of a second redox flow cell having a positive electrode side comprising an OER half-cell, wherein the first and second redox flow cells are decoupled for independent operation one from another.

In certain embodiments, the method can further comprise transferring a first, liquid, energy-bearing, electrolyte solution comprising the energy-bearing redox species in the oxidized state from the first redox flow cell to the second, and transferring a second, liquid, energy-bearing, electrolyte solution comprising the energy-bearing redox species in the reduced state from the second redox flow cell to the first. In certain embodiments, the method can further comprise storing a portion of the first liquid, energy-bearing, electrolyte solution in a first storage container and storing a portion of the second liquid, energy-bearing, electrolyte solution in a second storage container.

In certain embodiments, the method can further comprise the step of selecting said generating hydrogen alone, said regenerating the liquid, energy-bearing electrolyte solution alone, or concurrently both based an energy market condition. In certain embodiments, the energy-market condition comprises price of energy supply, energy demand, power grid health, $H_2$ price, $H_2$ demand, time of day, weather conditions, or a combination thereof.

In certain embodiments, the method can further comprise the steps of performing said generating step based on a first price of energy supply, and performing said regenerating step based a second price of energy supply, wherein the second price of energy supply is less than the first price of energy supply.

In some embodiments, a system for generating hydrogen can comprise an electrolyte-regeneration flow cell system configured to regenerate a spent, liquid, energy-bearing electrolyte solution from a hydrogen-production flow cell system operated independently from the electrolyte-regeneration flow cell system, wherein the energy-bearing electrolyte solution comprises an energy-bearing redox species dissolved therein and associated with a reversible redox reaction having a standard electrode potential within the water electrolysis voltage window for the electrolyte solution. In certain embodiments, the system can further comprise a controller operating the electrolyte-regeneration flow cell system, the hydrogen-production flow cell system, or both based on an energy market condition. In certain embodiments, the energy market condition comprises price of energy supply, energy demand, power grid health, $H_2$ price, $H_2$ demand, time of day, weather conditions, or a combination thereof. In certain embodiments, the energy-bearing redox species comprises iron.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

Embodiments described herein can perform hydrogen generation and electrolyte regeneration as independent operations in separate redox flow cells. The operations can be decoupled by using an energy-bearing redox pair that electrochemically bears energy facilitating flexible, efficient hydrogen generation. The inventors have determined by Hydrogen Analysis (H2A) that in spite of the progress in recent years to reduce costs, hydrogen production via water electrolysis still faces significant challenges in meeting future production and delivery goals with regard to cost per gasoline gallon equivalent (gge). The model shows that the cost of hydrogen for both forecourt and central production will exceed four dollars per gasoline gallon equivalent even in 2025 assuming current technology development trends. The challenge is not only capital cost but also operating feedstock costs, which can limit energy storage and delivery capacity of systems based on hydrogen (i.e., systems underprovide energy relative to expectations).

The problem of high-cost and delivery can be addressed by using a redox flow cell comprising a liquid, energy-bearing electrolyte solution in which at least one species of an energy-bearing redox pair is dissolved, to decouple the hydrogen evolution reaction from the reaction at the opposite electrode (e.g., the oxygen evolution reaction of conventional direct water electrolysis). Hydrogen generation, electrolyte regeneration, or both can be performed in a continuous manner, batch manner, or semi-batch manner. Each species of the energy-bearing redox pair is associated with a standard electrode potential between 0 and 1.23 V. Embodiments described herein can produce $H_2$ at a much lower voltage and with improved efficiency than that of typical water electrolysis systems, resulting in a lower operating cost. Furthermore, since it operates under low cell voltages, it provides flexibility in using low cost materials.

The redox reactions between the hydrogen generating side and the energy-bearing redox pair side of the redox flow cell allow for hydrogen production at much lower voltages and with improved efficiency compared to traditional water electrolysis systems, which often operate at 1.8 volts or higher (including an overpotential). In one example, the energy-bearing redox pair comprises $Fe^{2+}$ and $Fe^{3+}$. The primary cost drivers for $H_2$ production is the feedstock fuel (65%-80%), which is mainly the electricity. The theoretical equilibrium voltage of a H$_2$/Fe flow cell is 0.77 V, which is a 37% reduction from that of current water electrolysis (i.e., 1.23 V).

During hydrogen production, the energy-bearing redox species is reduced and the spent energy-bearing electrolyte solution in which the reduced species is dissolved needs to be replaced or regenerated. Regeneration of the energy-bearing electrolyte solution can be accomplished according to several embodiments described elsewhere herein.

Figure 1:
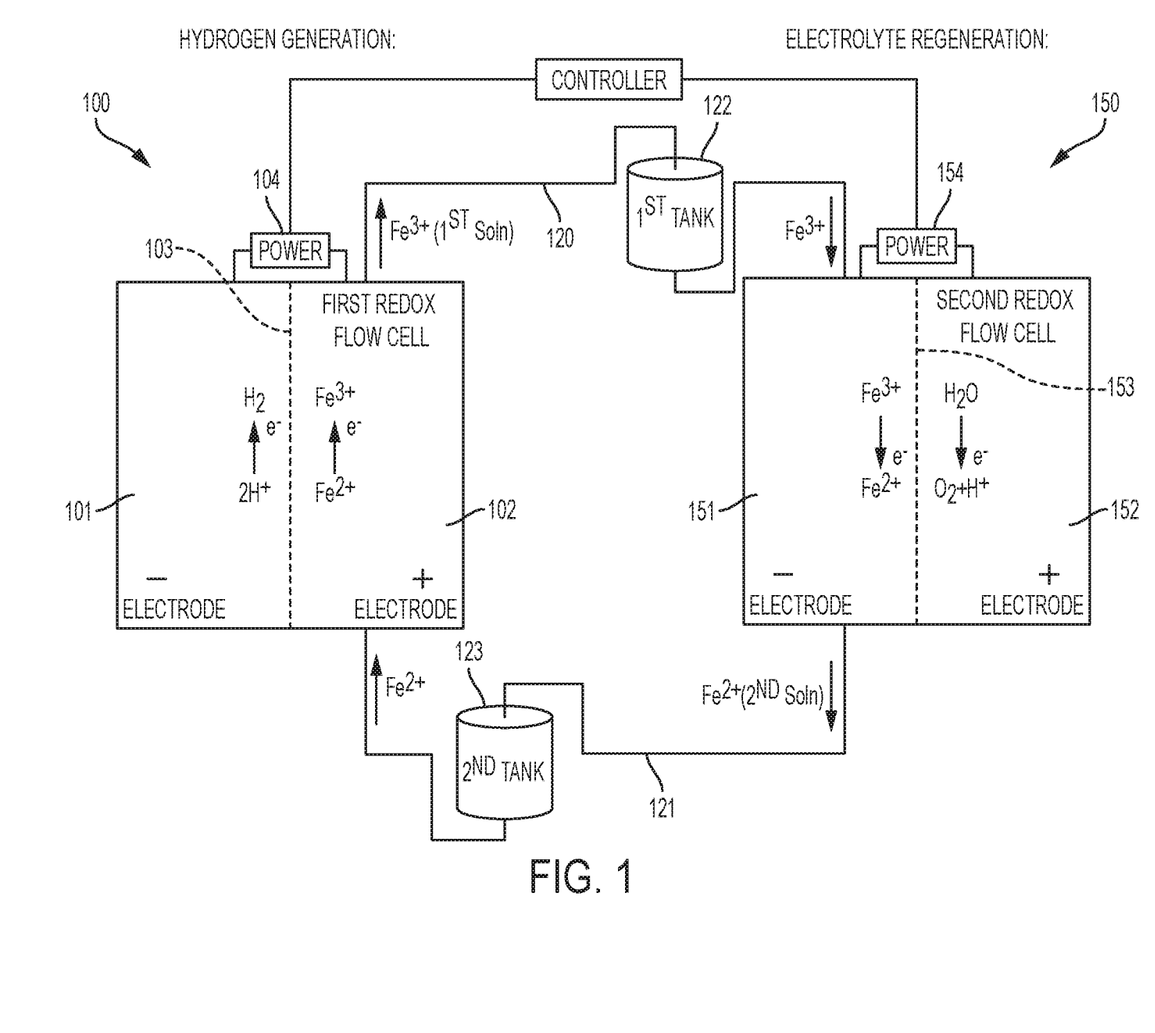
FIG. 1 is an illustration of a hydrogen generation system according to embodiments described herein.

Referring to FIG. 1, a schematic diagram illustrates one embodiment in which two independent redox flow cells utilize an energy-bearing redox species. The energy-bearing redox species bears energy for a duration in order to facilitate a decoupling of the hydrogen and oxygen evolving aspects of a conventional electrolysis system into the two independent redox flow cells. Hydrogen generation occurs in a first redox flow cell 100 having a negative electrode side 101 comprising a H$^+$/H$_2$ half-cell in which protons are reduced to yield hydrogen. The positive electrode side 102 comprises a liquid energy-bearing electrolyte solution comprising the energy-bearing redox species dissolved therein. The liquid electrolyte solution can comprise a solvent including, but not limited to, water, etc. The liquid electrolyte can be in acidic, neutral, or alkaline. Examples of acids, neutrals, and bases dissolved in the solution can include, but are not limited to, HCl, H$_2$SO$_4$, NaCl, KCl, NaOH, and KOH etc.

The electrode can comprise carbonaceous materials, including but not limited to, carbon, carbon fiber, carbon felt, carbon nanotubes, and graphene materials, especially when acidic liquid electrolytes are used. When a neutral or alkaline liquid electrolyte is used, metals, including, but not limited to porous metals, metal fibers, and metal fiber felts, can also be used.

A proton-permeable membrane separates the positive and negative electrode sides. Examples of membranes can include, but are not limited to, perfluorosulfonic acid membranes and other fluorinated or non-fluorinated hydrocarbon membranes. Anion exchange membranes can be used in the system, especially when an alkaline electrolyte is used. These also include fluorinated or non-fluorinated hydrocarbon membranes. A separator can also be used, such as PTFE/SiO2, PVDF/SiO2, PVC and PE/SiO2 separators.

As illustrated, the redox species in the reduced and oxidized states comprise Fe$^{2+}$ and Fe$^{3+}$, respectively. Although the Fe$^{2+}$/Fe$^{3+}$ redox pair has the benefit of low-cost and fast kinetics, it is chosen as an example. Other redox species having standard electrode potentials between 0 V and 1.299 V are suitable including metal or non-metal, inorganic and organic. Examples can include, but are not limited to iodine, vanadium, Br$_2$, Cl$_2$, and (CH$_2$)$_3$(CMe$_2$)$_2$NO (i.e., TEMPO). For instance, redox pairs (i.e., redox species in reduced and oxidized states) can include, but are not limited to, Br$_2$/Br$^-$, I$_3^-$/I$^-$, and V$^3$/VO$^{2+}$.

During hydrogen generation, a potential is applied 104 across the two electrodes. On the positive electrode side, Fe$^{2+}$ is oxidized to Fe$^{3+}$. The spent liquid, energy-bearing electrolyte solution comprising energy-bearing redox species in the oxidized state is transferred from the first redox flow cell 100 to the second redox flow cell 150 for electrolyte regeneration via circulation sub-system 120. The potential applied for hydrogen generation is much lower than that required for a conventional electrolysis system. The first redox flow cell can be described by the following half reactions.

Negative electrode side: H$^+$+e$^-$→½H$_2$(g)$E^0$=0V

Positive electrode side: Fe$^{2+}$−1e$^-$→Fe$^{3+}$$E^0$=0.77V

The second redox flow cell 150 has a negative electrode side 151 comprising the liquid energy-bearing electrolyte solution comprising the energy-bearing redox species. The positive electrode side 152 comprises an oxygen evolution reaction (OER) half-cell. A proton permeable membrane 153 separates the positive and negative electrode sides. In some embodiments, no precious metal catalysts are utilized for oxygen reaction.

The electrode can comprise carbonaceous materials, including, but are not limited to, carbon, carbon fiber, carbon felt, carbon nanotubes, and graphene materials, especially when acidic liquid electrolytes are used. When a neutral or alkaline liquid electrolyte is used, metals, including, but not limited to porous metals, metal fibers, and metal fiber felts, can also be used. Examples of membranes can include, but are not limited to, perfluorosulfonic acid membranes and other fluorinated or non-fluorinated hydrocarbon membranes. Anion exchange membranes can be used in the system, especially when an alkaline electrolyte is used. These also include fluorinated or non-fluorinated hydrocarbon membranes. A separator can also be used, such as PTFE/SiO2, PVDF/SiO2, PVC and PE/SiO2 separators.

During electrolyte regeneration, potential is applied across the two electrodes. The positive electrode side 152 yields oxygen. On the negative electrode side 151 the energy-bearing redox species is reduced from the oxidized state to the reduced state. According to the illustrated embodiment, from Fe$^{3+}$ to Fe$^{2+}$. The regenerated liquid, energy-bearing electrolyte solution comprising energy-bearing redox species in the reduced state is transferred from the second redox flow cell 150 to the first redox flow cell 100 via circulation sub-system 121. The second redox flow cell can be described by the following half reactions:

Negative electrode side: Fe$^{3+}$ + 1e$^{-1}$ → Fe$^{2+}$ $E^0$ = 0.77 V

Positive electrode side: $\frac{1}{2}$H$_2$O → $\frac{1}{4}$O$_2$ + H$^+$ + 1e$^{-1}$ $E^0$ = 1.23 V Decoupling can be further facilitated by electrolyte storage tanks. A first storage tank 122 can contain a first liquid, energy-bearing electrolyte solution comprising energy-bearing redox species in the oxidized state. A second storage tank 123 can contain liquid, energy-bearing electrolyte solution comprising energy-bearing redox species in the reduced state. The volumes of the storage tanks can be scaled to meet hydrogen generation and storage needs to maximize the cost benefit.

The inventors determined that decoupling the hydrogen and oxygen redox reactions from being in the same reaction cell, gives the system flexibility to overcome the sluggish high overpotential oxygen reaction and to decrease energy consumption by lowering the reaction voltage. Accordingly, while the total potential applied for hydrogen generation and electrolyte regeneration can be similar to that required for traditional electrolysis, embodiments described herein are enabled to perform the hydrogen generation during first energy-market conditions. Electrolyte regeneration can be performed at a different time when the energy-market conditions are advantageous for regeneration. For example, the electrolyte can be regenerated while hydrogen demand is low, electrical energy prices are relatively lower, and/or grid health can be improved by utilizing excess energy (for example, during wind or solar curtailment). Similarly, hydrogen generation can occur while hydrogen demand is high, electrical energy prices are low, and/or grid health can be improved by utilizing excess energy.

The explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

EXAMPLES AND COMPARISONS

To further illustrate certain embodiments of the disclosed hydrogen fuel generation systems and methods, and to provide various comparative analyses and data, below are some examples with comparison test data.

Traditional hydrogen generation techniques use a water electrolyzer to produce hydrogen and oxygen from water. The technique is typically slow and operates at approximately 1.8-2 A and around 2 V. The cost to operate can be a limitation and is currently approximately ~5 USD/kg. A significant portion of the cost is electricity (i.e., feedstock) because of the high current and voltage supply requirements. Based on the highly reversible $Fe^{3+}/Fe^{2+}$ redox couple as an energy-bearing redox species, the operating voltage of a first redox flow cell generating hydrogen can be less than or equal to 1 V, which includes an overpotential allowance. In certain embodiments, a minimal operating voltage can between approximately 0.8 V and 0.9 V. Due to the direct voltage reduction, the electricity expenditure can be reduced nearly 52%. The operating voltage of a second redox flow cell regenerating the spent electrolyte solution from the first redox flow cell can be between 0.5 V and 1 V, making the total energy expenditure for both redox flow cells similar. However, the energy-bearing redox species allows for decoupling of the hydrogen generation and electrolyte regeneration so that each can be performed independently when energy-market conditions are advantageous and optimized for both. For example, hydrogen generation can be performed during the day to meet demand. The spent electrolyte solution can be stored in a container. Regeneration of the electrolyte can occur at night time, when electricity is often cheaper. In one example, windmill power is commonly more abundant at night when supply exceeds demand.

Figure 2A:
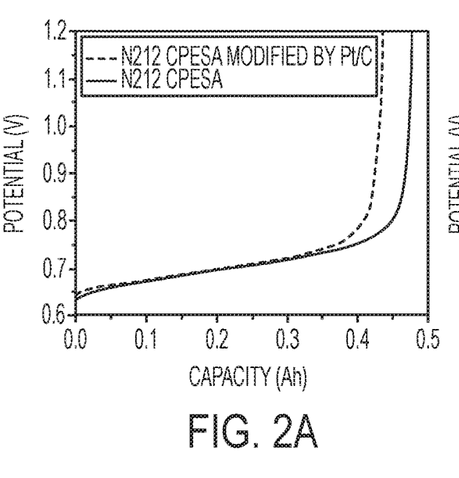
FIGS. 2A and 2B include potential versus capacity graphs of a hydrogen generation redox flow cell being charged under two different conditions (100 and 300 mA/cm$^2$, respectively).
Figure 2B:
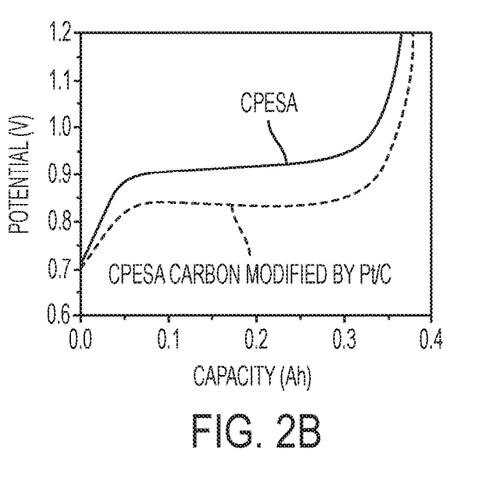

Experimental data shown in FIG. 2 demonstrates hydrogen generation using a system similar to that shown in FIG. 1. The first (i.e., hydrogen-generating) redox flow cell comprised a flow cell with $H_2/H^+$ and $Fe^{3+}/Fe^{2+}$ redox pairs at the negative and positive half-cells, respectively. An interdigitated flow field was used with carbon-based CPESA electrode and Nafion 212 membranes. Specifically, the gas diffusion electrode had a 0.2 mg $Pt/cm^2$ loading at the hydrogen electrode while pristine. The CP-ESA carbon electrode was modified with a catalyst (20 wt % of Pt/C catalyst was drop-coated onto the CP-ESA electrode (0.01 mg $Pt/cm^2$ loading) at the iron electrode. The energy-bearing electrolyte solution comprising the Fe-based redox species had a flow rate of approximately 60 mL/min through the positive half-cell. The solution further comprised $FeSO_4$ or $FeCl_2$ dissolved in 2 M HCl charged at 100 (FIG. 2A) and 300 $mA/cm^2$ (FIG. 2B), respectively. Hydrogen generation was performed at low voltage (<1.0 V). A carbon-based electrode (e.g., carbon paper—extra surface area [CPESA]) was used in the test flow cell, but other forms of carbon electrodes can be used as alternatives. Examples include, but are not limited to graphite, carbon fiber, carbon nanotube, and graphene-based electrodes. Other forms of electrodes can also be used, including metals and/or other conductive materials. Examples can include, but are not limited to, platinum and other platinum group metals (PGM). Non-PGM catalysts can be used to modify the electrode to improve the system performance. A sulfonated tetrafluoroethylene-based fluoropolymer-copolymer membrane (e.g., Nafion 212) was used in the instant example, but other polymeric, porous, microporous, nonporous, ceramic membranes can be used. The data was collected without electrolyte regeneration, which explains the voltage increase and the performance decline over time because the $Fe^{2+}$ was being depleted as the redox reactions proceeded.

Figure 3A:
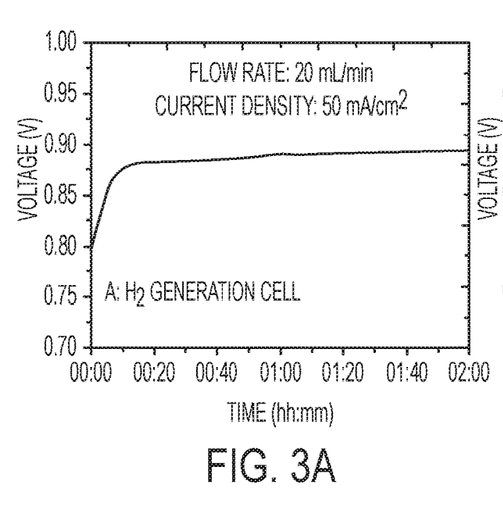
FIGS. 3A and 3B are graphs of voltage as a function of time for a hydrogen generation redox flow cell and an electrolyte regeneration redox flow cell, respectively. The total current and electrolyte flow rate of both cells are set to 0.5 A and 20 mL/min, respectively.
Figure 3B:
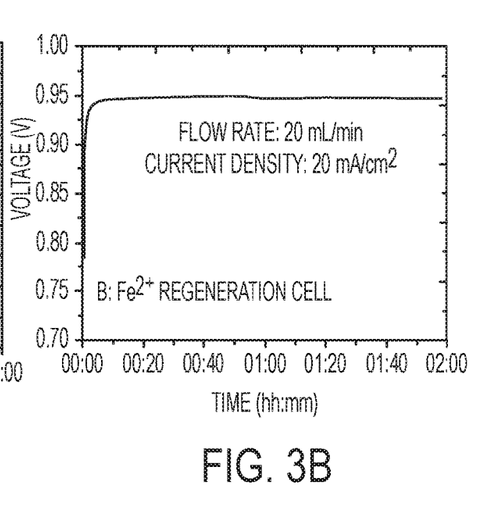

Referring to FIG. 3A, an electrolyte-regeneration redox flow cell can be used to regenerate the spent, liquid, energy-bearing electrolyte solution from the hydrogen-production flow cell. The electrolyte-regeneration redox flow cell can be operated independently from the hydrogen generation flow cell. FIG. 3B are graphs showing the total current and electrolyte flow rate of both cells, which were set to 0.5 A and 20 mL/min, respectively.

While embodiments described herein utilize more units than a traditional single unit electrolyzer, hydrogen generation costs can nevertheless be lower based on the increased flexibility allowed by the independent operation of the two flow cells. A cost model was set up using NREL's H2A model to calculate levelized cost using a standard discounted cash flow rate of return methodology. The cost model considers capital cost and feedstock cost. For all calculations we calculated the cost for a plant producing 400 kg $H_2$/day.

A very simple electrochemical model was used consistent with the system described in the instant example. The analysis compares a model for a PEM electrolyzer operating at 1.8 V (the control). The hydrogen generation redox flow cell operates at 1.0 V, and the electrolyte regeneration redox flow cell operates at 1.0 V. The electrolyzer and hydrogen generation redox flow cell were assumed to operate at 1 A/m². The electrolyte regeneration redox flow cell was assumed to operate anywhere from 0.5 to 1 A/m².

The capital cost was calculated based on having two stacks for Iron redox, and one stack for the hydrogen PEM electrolyzer. Unit prices were found for carbon felt, the electrodes, the bipolar plates, the PVC frame, the catalyst, and the Nafion membrane. The oxygen electrode required for the electrolyte regeneration redox flow cell is significantly more expensive than the electrode in the hydrogen generation redox flow cell.

Based on the target amount of hydrogen required (1000 kg $H_2$/day), the total charge per day required is straight forward to calculate:

$$Q = F \frac{m_{H_2}}{M_H}$$

The stacks were sized by calculating the current needed to produce the desired amount of hydrogen during the peak period of time, and using that along with the maximum possible current density for each stack to obtain an area.

$$A_{HyFe} = \frac{Q}{j_{HyFe} t_{Peak}}$$

$$A_{regen} = \frac{Q}{j_{regen} t_{offPeak}}$$

The electrical feedstock required was calculated based on the voltage required for each stack.

$$E_{req} = Q(V_{Regen} + V_{HyFe})$$

After calculating the electrical feedstock required, and the area of the stack, the unit prices for the individual stack components and the electrical price data was used to calculate the capital cost and the feedstock cost.

Figure 4A:
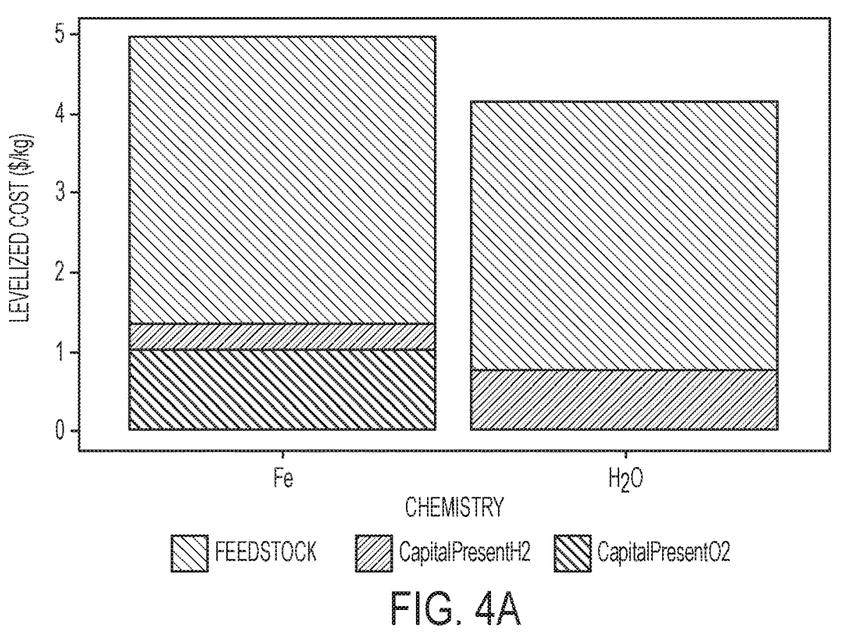
FIGS. 4A and 4B are charts comparing levelized cost and hydrogen production cost between embodiments described herein and traditional PEM electrolysis systems.
Figure 4B:
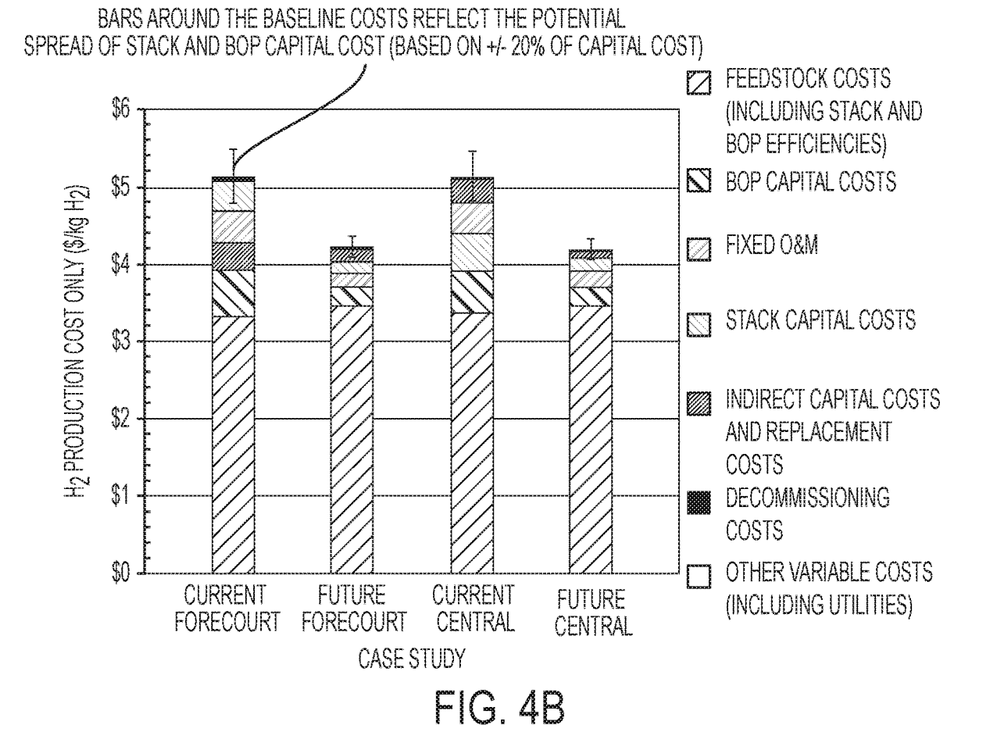
Figure 5A:
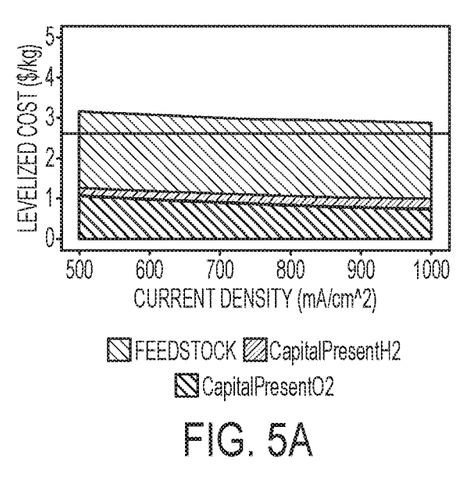
FIGS. 5A-5F are graphs of estimated levelized cost versus current density for hydrogen production in various state markets. Estimated results for the hydrogen generation redox flow cell are shown by the black horizontal line
Figure 5B:
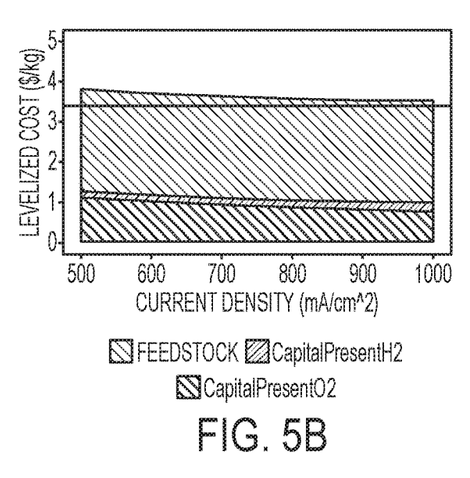
Figure 5C:
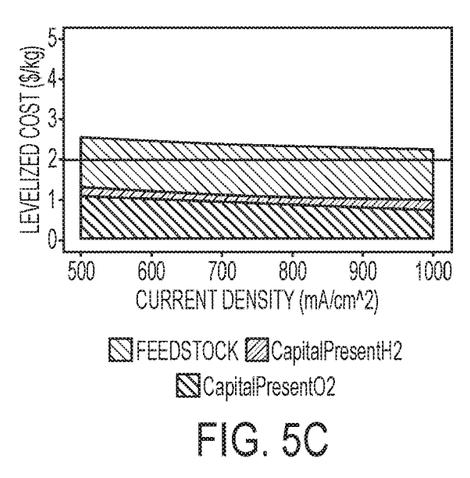
Figure 5D:
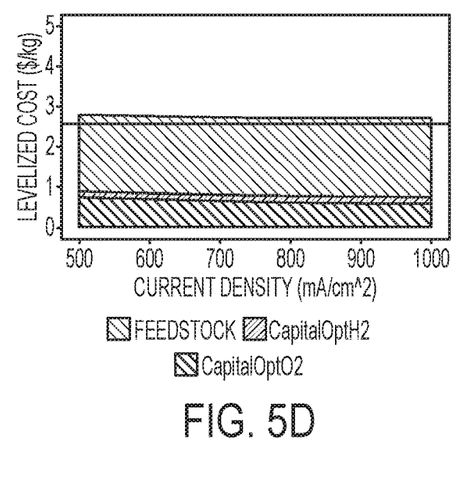
Figure 5E:
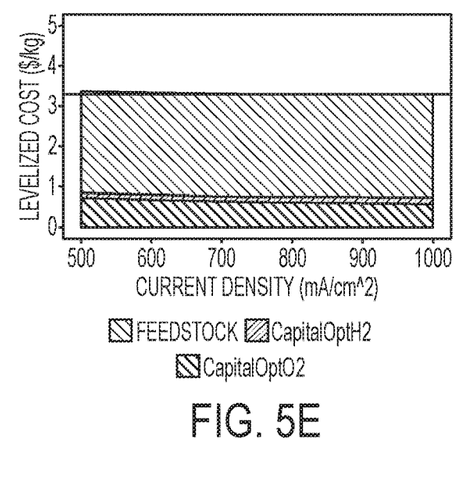
Figure 5F:
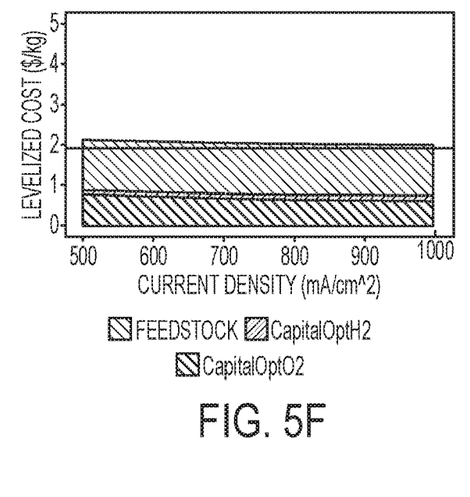

To validate the approach, the same assumptions for electricity price and capital cost were plugged into the H2A spreadsheet in order to calculate the levelized costs of a hydrogen PEM electrolyzer. The result for H2A was the same levelized cost of 4-5 $/kg (FIGS. 4A and 4B).

The feedstock cost was calculated using electricity price data, which was obtained from 3 regions. Hourly data was obtained for all three regions. Pacific Northwest energy data was obtained for the Mid-Columbia Index from Powerdex, Inc. California energy market data was obtained from CAISO. New York energy market data was obtained from NYISO.

From this hourly data, the peak and off-peak cost is calculated simply by averaging over peak and non-peak periods. For the first analysis, these peak and off-peak time periods were preset. In later optimization work, these were adjusted to minimize levelized cost.

The cost model was run at various current densities for the hydrogen generation redox flow cell, various cost scenarios, and various electricity market regions. The corresponding model results for the hydrogen generation redox flow cell are shown by the black horizontal line in FIGS. 5A-5F.

Hydrogen redox flow cell appears advantageous in cases where electricity is very expensive (e.g., in the New York and California regions). The hydrogen redox flow cell can be adapted for additional advantages in the markets in which it is operated. For example, there can be a very high variance in electricity price. If there is a large difference in price between peak and off peak, then embodiments described herein can provide significant cost advantage. The following equation is but one example of a criteria for determining cost conditions favoring embodiments described herein.

$$\text{Cost}_{Peak} E_{HyFe} + \text{Cost}_{OffPeak} E_{Regen} < \text{Cost}_{Peak} E_{PEM}$$

$$\frac{\text{Cost}_{Offpeak}}{\text{Cost}_{Peak}} < \frac{E_{PEM} - E_{HyFe}}{E_{Regen}}$$

$$\frac{\text{Cost}_{Offpeak}}{\text{Cost}_{Peak}} < 0.8$$

Figure 6:
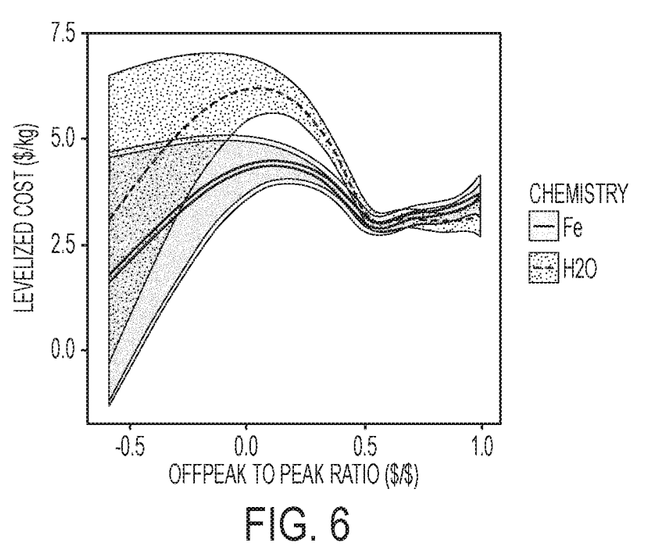
FIG. 6 is a graph comparing levelized cost versus ratios of offpeak to peak costs between embodiments described herein and traditional PEM electrolysis.
Figure 7:
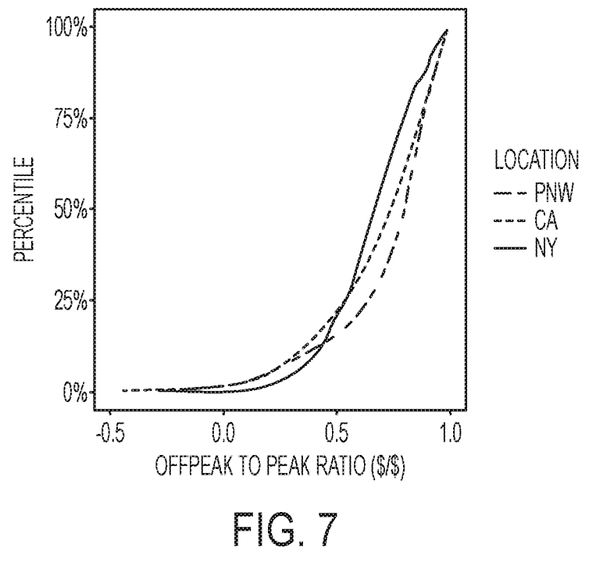
FIG. 7 is a graph of percentile versus ratios of offpeak to peak costs for embodiments described herein being operated in various state energy markets

This shows that the ratio of the offpeak cost to the peak cost is a useful parameter for understanding where Fe regen cell has the advantage. If under certain operation conditions, the ratio of offpeak cost to the peak cost is lower than 0.8, it means the new system will have lower cost than the traditional PEM electrolyzer. The model was run using electricity data from various days, and the results plotted vs the offpeak to peak ratio in FIG. 6. In order to understand the distribution of the offpeak to peak ratio, it was calculated for each day, and the cumulative distribution was plotted as shown in FIG. 7.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:
1. A system of hydrogen generation comprising:
A first redox flow cell generating hydrogen and having:
A positive electrode side oxidizing an energy-bearing redox species dissolved in a liquid, energy-bearing, electrolyte solution to an oxidized state, wherein the liquid, energy-bearing electrolyte solution comprises an aqueous acid solution;
A negative electrode side comprising a $H^+/H_2$ half-cell; and
A proton permeable membrane separating the positive electrode and negative electrode sides; and
A second redox flow cell regenerating the liquid, energy-bearing electrolyte solution and having:
A negative electrode side reducing the energy-bearing redox species to a reduced state;
A positive electrode side comprising an oxygen evolution reaction (OER) half-cell;
A proton permeable membrane separating the positive electrode and negative electrode sides;
A controller operably connected to the first and second redox flow cells and configured to select for operation of the first redox flow cell alone, the second redox flow cell alone, or concurrently both based on an energy-market condition;
wherein the energy-bearing redox species is associated with a reversible redox reaction having a standard electrode potential within a water electrolysis voltage window for the electrolyte solution, and wherein the first and second redox flow cells are decoupled for independent operation one from another; and a circulation sub-system configured to transfer a first, liquid, energy-bearing, electrolyte solution comprising the energy-bearing redox species from the first redox flow cell to the second, and configured to transfer a second, liquid, energy-bearing, electrolyte solution comprising the energy-bearing redox species from the second redox flow cell to the first.

2. The system of claim 1, wherein the circulation sub-system further comprises a first storage container configured to store a portion of the first liquid, energy-bearing, electrolyte solution and a second storage container configured to store a portion of the second liquid, energy-bearing, electrolyte solution.

3. The system of claim 1, wherein energy-market condition comprises price of energy supply, energy demand, power grid health, $H_2$ price, $H_2$ demand, time of day, weather conditions, or a combination thereof.

4. The system of claim 1, wherein the energy-bearing redox species in the reduced and oxidized states comprise $Fe^{2+}$ and $Fe^{3+}$, respectively.

5. The system of claim 1, wherein the energy-bearing redox species comprises iodine, vanadium, bromine, chlorine, TEMPO, respectively.

6. The system of claim 1, wherein the aqueous acid solution comprises a dissolved acid having a concentration greater than or equal to 2 M, 4 M, 6 M, 8 M, or 10 M.

7. The system of claim 1, wherein the liquid, energy-bearing electrolyte solution comprises the energy-bearing redox species in an amount greater than or equal to 0.5 M, 1 M, 1.5 M, 2 M, 3M, 4 M, 5 M, or 8 M.

* * * * *

UNITED STATES PATENT AND TRADEMARK OFFICE
CERTIFICATE OF CORRECTION

| | |
|---|---|
| PATENT NO. | : 11,050,078 B2 |
| APPLICATION NO. | : 15/988213 |
| DATED | : June 29, 2021 |
| INVENTOR(S) | : Wei Wang et al. |

It is certified that error appears in the above-identified patent and that said Letters Patent is hereby corrected as shown below:

On the Title Page

Item (56) References Cited, page 2, 1st Column, 62nd Line - Replace "molecular metal oxide redox mediatior in water splitting, Science," with --molecular metal oxide redox mediator in water splitting, Science,--

Item (56) References Cited, page 3, 1st Column, 22nd Line - Replace "European Wind and Ebergy Association, "Wind in Power: 2011"" with --European Wind and Energy Association, "Wind in Power: 2011--

Item (56) References Cited, page 3, 2nd Column, 2nd Line - Replace "Metal-Metal Oxide-Graphene Triple Junction Points", Jounral of" with --Metal-Metal Oxide-Graphene Triple Junction Points", Journal of--

Item (56) References Cited, page 3, 2nd Column, 3rd Line - Replace "the America Chemical Society vol. 133, 2011, United States, pp." with --the American Chemical Society vol. 133, 2011, United States, pp.--

Item (56) References Cited, page 3, 2nd Column, 44th Line - Replace "Ohno et al., "Unique Effects of Iron(III) ions on Photocatalytic and" with --Ohno et al., "Unique Effects of Iron(III) Ions on Photocatalytic and--

Item (56) References Cited, page 3, 2nd Column, 49th Line - Replace "Society Meeting Abstracts 1552-1582, availabie online at http://ma." with --Society Meeting Abstracts 1562-1562, available online at http://ma.--

Item (56) References Cited, page 3, 2nd Column, 61st Line - Replace "Constants at n-type InP/CH3OH Junctions", Jounral of Physical" with --Constants at n-type InP/CH3OH Junctions", Journal of Physical--

Signed and Sealed this
Fifth Day of July, 2022

*Katherine Kelly Vidal*

Katherine Kelly Vidal
*Director of the United States Patent and Trademark Office*

CERTIFICATE OF CORRECTION (continued)
U.S. Pat. No. 11,050,078 B2

Item (56) References Cited, page 3, 2nd Column, 71st Line - Replace "trolyte Studies", Jounral of Power Sources vol. 189, 2009, Nether-" with --trolyte Studies", Journal of Power Sources vol. 189, 2009, Nether- --

Item (56) References Cited, page 4, 1st Column, 2nd Line - Replace "Electrocatalysis of Oxygen Reduction on Pt and non-Pt Surfaces:" with --Electrocatalysis of Oxygen Reduction on Pt and Non-Pt Surfaces:--

Item (56) References Cited, page 4, 2nd Column, 53rd Line - Replace "Wei et al., "Towards High-Performance Nonagueous Redox Flow" with --Wei et al., "Towards High-Performance Nonaqueous Redox Flow--

Item (56) References Cited, page 4, 2nd Column, 57th Line - Replace "Separator as a High Performance All-Vanadium Redox Flow Bat-" with --Separator as a High-Performance All-Vanadium Redox Flow Bat- --

In the Specification

Column 1, Line 55 - Replace "operating cost" with --operating cost.--

Column 4, Line 16 - Replace "horizontal line" with --horizontal line.--

Column 4, Line 22 - Replace "energy markets" with --energy markets.--

Column 6, Lines 7-9 - Replace
"Negative electrode side: $H^+ + e^- \rightarrow \frac{1}{2}H_2(g) E^0 = 0V$
Positive electrode side: $Fe^{2+} - 1e^- \rightarrow Fe^{3+} E^0 = 0.77V$" with
--Negative electrode side: $H^+ + e^- \rightarrow \frac{1}{2}H_2(g) \qquad E^0 = 0V$
Positive electrode side: $Fe^{2+} - 1e^- \rightarrow Fe^{3+} \qquad E^0 = 0.77V$--